United States Patent [19]
Burdick et al.

[11] Patent Number: 5,228,909
[45] Date of Patent: Jul. 20, 1993

[54] SODIUM FORMATE FLUIDIZED POLYMER SUSPENSIONS

[75] Inventors: Charles L. Burdick, Landenberg, Pa.; Jackie N. Pullig, Wilmington, Del.

[73] Assignee: Aqualon Company, Wilmington, Del.

[21] Appl. No.: 706,334

[22] Filed: May 28, 1991

Related U.S. Application Data

[63] Continuation of Ser. No. 600,745, Oct. 22, 1990, abandoned.

[51] Int. Cl.$^5$ .......... C08L 31/02; B32B 5/02; B05D 1/00
[52] U.S. Cl. .......................... 106/194; 524/394
[58] Field of Search .................. 524/394; 106/194

[56] References Cited

U.S. PATENT DOCUMENTS

| | | | |
|---|---|---|---|
| 4,883,536 | 11/1989 | Burdick | 106/194 |
| 4,883,537 | 11/1989 | Burdick | 106/194 |

*Primary Examiner*—Joseph L. Schofer
*Assistant Examiner*—Jeffrey T. Smith
*Attorney, Agent, or Firm*—David Edwards

[57] ABSTRACT

Fluidized aqueous suspensions of 15% or more by weight hydroxyethylcellulose, hydrophobically modified cellulose ether, hydrophobically modified hydroxyethylcellulose, methylcellulose, hydroxypropylmethylcellulose and polyethylene oxide are prepared by addition of the polymer to a concentrated sodium formate solution containing xanthan gum as a stabilizer.

5 Claims, No Drawings

SODIUM FORMATE FLUIDIZED POLYMER SUSPENSIONS

This is a continuation-in-part application of application Ser. No. 07/600,745 filed Oct. 22, 1990, now abandoned.

FIELD OF THE INVENTION

The invention relates to aqueous suspensions of nonionic polymers in a salt medium. In particular, the invention relates to the aqueous suspension of nonionic polymers in aqueous sodium formate.

BACKGROUND OF THE INVENTION

U.S. Pat. No. 4,883,536 "Suspension of Water Soluble Polymers in Aqueous Media Containing Dissolved Salts" and U.S Pat. No. 4,883,537 "Aqueous Suspension of Carboxymethylcellulose" both issued in the name of C. L. Burdick and assigned to the Aqualon Company teach that salts with divalent or trivalent anions are useful for suspension of cellulose ether derivatives. However, these and other references in the prior art gave no indication that a single monobasic acid salt would be similarly useful for fluidized polymer suspensions. Thus, it remained for the present invention to provide such an advance in the state of the art.

SUMMARY OF THE INVENTION

It is an object of the invention to provide fluidized polymer suspensions for paint, paper, mining, construction and oil and gas recovery uses for nonionic cellulose ethers in water and salt; characterized in that the salt is sodium formate. Sodium formate is a suspending salt for hydroxyethylcellulose, hydrophobically modified hydroxyethylcellulose, methylcellulose, methylhydroxypropylcellulose and derivatives thereof, e.g., hydrophobically modified ethylhydroxyethylcellulose, etc.

In a preferred process of the invention xanthan gum is dissolved in water prior to the addition of sodium formate, then at lest one nonionic polymer selected from the group of hydroxyethylcellulose, methylcellulose or derived ethers is added to the aqueous xantham/sodium formate solution to form a fluid suspension of the polymers.

DETAILED DESCRIPTION OF THE INVENTION

In view of the success which has been achieved with aqueous polymer suspensions in carbonates, sulfates and phosphates; it was unexpected to discover that one and only one monobasic acid salt could provide such suspending benefit. Further it was found that a particular material i.e., sodium formate, which was previously considered to be a low value byproduct, could actually provide such dramatic benefits in a before known application. Not only was sodium formate readily available, but the process of preparing fluidized polymer suspensions was less critical than previously experienced with multibasic acid salts.

While other salts such as potassium formate, calcium formate and acetates and/or bicarbonates might be expected to function in the same manner as sodium formate, such was not the case in actual comparison tests for preparing fluid suspensions of 15 parts or more hydroxyethylcellulose in a total suspension composition of 100 parts.

| Salt | Salt Amount g | Water g | Natrosol 250 GR | Result |
|---|---|---|---|---|
| Sodium Formate | 30 | 55 | 15 | Fluid Suspension |
| Potassium Formate | 30 | 55 | 15 | Thick Gel |
| Sodium Acetate | 30 | 55 | 15 | Thick Gel |
| Calcium Formate | 30 | 55 | 15 | Thick Gel |
| Potassium Bicarbonate | 30 | 55 | 15 | Thick Gel |
| Sodium Bicarbonate | 30 | 55 | 15 | Thick Gel |

In addition to the discovery of the unique behavior of sodium formate in relation to other monovalent anion salts, it was surprising to also discover that not all nonionic polymers could be suspended. Suitable nonionic polymers for sodium formate suspension were hydroxyethylcellulose, hydrophobically modified hydroxyethylcellulose, hydrophobically modified ethyl hydroxyethylcellulose, methylcellulose, methylhydroxypropylcellulose and polyethylene oxide (PEO). Neither anionic or cationic cellulose ethers were satisfactorily suspended and neither were nonionic guar gum or polyacrylamide.

It was observed that the ability of sodium formate solutions in water to be an effective suspending medium for water soluble polymer was dependent upon a certain concentration of the sodium formate in water being present. It was found for example that greater than 30% sodium formate concentration in water was required to prepare a fluid suspension of hydroxyethylcellulose as shown in the following table:

| Sodium Formate g | Water g | Result |
|---|---|---|
| 20 | 65 | Thick Gel |
| 25 | 60 | Thick Gel |
| 30 | 55 | Fluid Suspension |

The following is a model fluid polymer suspension according to the invention in which the ingredients are listed in order of their addition to a mixing container.

| Ingredient | Parts By Weight Range | Ideal |
|---|---|---|
| Water | 45–55 | 49.85 |
| Xanthan Gum | 0.10–0.20 | 0.15 |
| Sodium Formate | 28–35 | 30 |
| Polymer | 10–25 | 20 |

While it is possible to suspend the polymer in just sodium formate, the suspension must be restirred periodically if no xanthan gum is incorporated as a suspension stabilizer. In this respect it was also surprising to find that xanthan gum was the most satisfactory agent for this purpose. Attempts to use other suspending agents such as carboxymethylcellulose (CMC), guar gum and sodium alginate were not as successful. However, in the case where the suspension is intended for use within a relatively short time after preparation, it would be possible to omit the xanthan gum and simply prepare a sodium formate solution and mix in the polymer to form a fluid suspension which could be employed in either a continuous or batch process.

The invention has industrial applicability in paint, construction materials, paper, mining, oil and gas recovery and other fields yet to be explored. The following examples illustrate the practice of the invention without being limiting.

EXAMPLE 1

Into 5485 g of deionized water stirred vigorously a 15 g portion of xanthan gum available from Kelco Inc. was added. Stirring continued for 30 minutes until a hazy, slightly viscous solution was obtained. Then 3000 g, sodium formate availabe form Aqualon Company was added and allowed to dissolve. Finally, 1500 g of Aqualon Natrosol®250GR hydroxyethylcellulose was added over 10-20 minutes to form a fluid suspension which had a Brookfield viscosity of 3000 mPa.s at 25° C. After one month the fluid suspension was again measured as having the same viscosity without any signs of settling.

Portions of this sodium formate/xanthan/HEC fluid suspension can be successfully employed for the paint, paper coatings and construction applications described with prior art fluidized polymer suspensions in U.S. Pat. Nos. 4,883,536 and 4,883,537 as well as Applicant's U.S. patent applications Ser. Nos. 429,195 and 508,355.

EXAMPLE 2

Fluidized polymer suspensions were prepared as in Example 1 except that the xanthan gum was not added and the nonionic polymers tested included hydroxyethylcellulose, hydrophobically modified hydroxyethylcellulose, methylcellulose, methyl hydroxypropylcellulose all available from Aqualon, hydrophobically modified ethylhydroxyethylcellulose available from Berol Nobel as Bermocol® EHM 100, hydrophobically modified polymer available from Union Carbide Company as Cellosize® HEC SPATTER GUARD 100 and polyethylene oxide available as Polyox® 301 from Union Carbide.

In all cases it was possible to prepare fluidized polymer suspensions with Brookfield viscosities ranging from 1000 to 10,000 mPa.s at 25° C.

Noticeable settling was observed after stirring was stopped in about 24 to 72 hours.

EXAMPLE 3

The nonionic polymers of Example 2 were all prepared as fluidized polymer suspensions using from 0.10 to 0.20 parts by weight xanthan gum per 100 parts of total suspension as per the general procedure of Example 1. Suspensions stable for at least one month were obtained in all cases.

EXAMPLE 4

The procedure of Example 1 was repeated except that water and sodium formate levels were varied in an attempt to prepare fluidized polymer suspensions with nonionic guar gum, polyacrylamide, sodium carboxymethylcellulose and cationic hydroxyethylcellulose. Thick gels were obtained in all tests.

Example 5

Example 1 was repeated except that a salt believed to have similar properties was substituted for sodium formate. Only thick gels were obtained in tests varying amounts and types of salt, water and polymer for the following salts: calcium formate, potassium formate, sodium acetate, potassium bicarbonate and sodium bicarbonate.

EXAMPLE 6

Example 1 was repeated except that water and sodium formate ratios were varied as shown in Table 1.

TABLE 1

| Sodium Formate | Water | HEC | Result |
|---|---|---|---|
| 20 | 65 | 15 | Thick Gel |
| 25 | 60 | 15 | Thick Gel |
| 30 | 55 | 15 | Fluid Suspension |

Table 1 illustrates the production of a fluid suspension in a concentrated sodium formate solution (30), whereas 20% and 25% solution produced only an unsatisfactory gel.

EXAMPLE 7

Example 6 was repeated except that 28 g sodium formate was added to 57 g and 15 g HEC added. A fluid suspension was obtained.

This example illustrates that a minimum of 28% by weight sodium formate salt is required to prepare fluidized polymer suspensions according to the invention.

What is claimed is:

1. A fluidized polymer suspension comprising a polymer suspended in 28% or more by weight based on total weight of water and salt of sodium formate dissolved in water where the suspended polymer is one or more of a nonionic polymer selected from the group consisting of hydroxyethylcellulose, hydrophobically modified hydroxyethylcellulose, hydrophobically modified ethylhydroxyethylcellulose, methylcellulose, methylhydroxypropylcellulose and polyethylene oxide (PEO).

2. The suspension of claim 1 where 30 to 35% by weight or more sodium formate is dissolved in water.

3. The suspension of claim 2 further comprising 0.10 to 0.20 weight % xanthan gum as a stabilizing agent.

4. The suspension of claim 3 where the hydrophobically modified hydroxyethylcellulose is modified with a cetyl or nonylphenyl group.

5. The suspension of claim 3 where the hydrophobically modified ethylhydroxyethylcellulose is modified with an arylalkyl group.

* * * * *

UNITED STATES PATENT AND TRADEMARK OFFICE
CERTIFICATE OF CORRECTION

PATENT NO. : 5,228,909

DATED : July 20, 1993

INVENTOR(S) : C. L. Burdick and J. N. Pullig

It is certified that error appears in the above-identified patent and that said Letters Patent is hereby corrected as shown below:

Column 3, line 10

"availabe" should read -- available --

"form" should read --from--

Column 4, line 31

Insert "water" after "57g"

Signed and Sealed this

Twenty-third Day of August, 1994

Attest:

BRUCE LEHMAN

Attesting Officer

Commissioner of Patents and Trademarks